(12) United States Patent
Liu et al.

(10) Patent No.: US 11,481,432 B2
(45) Date of Patent: Oct. 25, 2022

(54) REVERSE IMAGE SEARCH METHOD, APPARATUS AND APPLICATION SYSTEM

(71) Applicant: BOE TECHNOLOGY GROUP CO., LTD., Beijing (CN)

(72) Inventors: Xiangyang Liu, Beijing (CN); Xiying Zhang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 175 days.

(21) Appl. No.: 16/958,499

(22) PCT Filed: Nov. 1, 2019

(86) PCT No.: PCT/CN2019/114962
§ 371 (c)(1),
(2) Date: Jun. 26, 2020

(87) PCT Pub. No.: WO2020/181793
PCT Pub. Date: Sep. 17, 2020

(65) Prior Publication Data
US 2021/0224313 A1 Jul. 22, 2021

(30) Foreign Application Priority Data
Mar. 11, 2019 (CN) .......................... 201910180747.2

(51) Int. Cl.
*G06F 16/532* (2019.01)
*G06F 16/55* (2019.01)
(Continued)

(52) U.S. Cl.
CPC ............ *G06F 16/532* (2019.01); *G06F 16/51* (2019.01); *G06F 16/55* (2019.01); *G06K 9/628* (2013.01); *G06V 10/40* (2022.01); *G06V 10/751* (2022.01)

(58) Field of Classification Search
CPC ...... G06K 9/628; G06V 10/751; G06V 10/40; G06F 16/51; G06F 16/55; G06F 16/532
See application file for complete search history.

(56) References Cited

U.S. PATENT DOCUMENTS 10,467,504 B1 * 11/2019 Hamedi ................. G06V 10/40
10,482,122 B2 * 11/2019 Tusk ......................... G06T 7/11
(Continued)

FOREIGN PATENT DOCUMENTS

| CN | 102254015 A | 11/2011 |
|---|---|---|
| CN | 102687140 A | 9/2012 |

(Continued)

OTHER PUBLICATIONS

International Search Report dated Jan. 16, 2020, issued in counterpart application No. PCT/CN2019/114962 (10 pages).
(Continued)

*Primary Examiner* — Mia M Thomas
(74) *Attorney, Agent, or Firm* — WHDA, LLP

(57) ABSTRACT

The present disclosure relates to a reverse image search method. The reverse image search method may include receiving a search image; extracting feature points of the search image; finding classes corresponding to the feature points of the search image respectively in an image classification index table, the classes comprising images in an image library; and searching the classes corresponding to the feature points of the search image in the image classification index table to obtain a target image having the largest number of identical feature points of the search image.

17 Claims, 9 Drawing Sheets

(51) Int. Cl.
*G06F 16/51* (2019.01)
*G06K 9/62* (2022.01)
*G06V 10/40* (2022.01)
*G06V 10/75* (2022.01)

(56) References Cited

U.S. PATENT DOCUMENTS

| | | | |
|---|---|---|---|
| 10,482,336 B2* | 11/2019 | Burge | G06F 16/367 |
| 10,521,667 B2* | 12/2019 | Holzschneider | G06F 16/51 |
| 10,740,385 B1* | 8/2020 | Hohwald | G06F 16/55 |
| 10,909,166 B1* | 2/2021 | Bogazzi | G06K 9/6231 |
| 2013/0086105 A1* | 4/2013 | Hammontree | G06F 3/167 |
| | | | 707/769 |
| 2014/0086497 A1* | 3/2014 | Fei-Fei | G06K 9/6282 |
| | | | 382/224 |
| 2014/0099033 A1* | 4/2014 | Natarajan | G06V 10/48 |
| | | | 382/205 |
| 2015/0026785 A1* | 1/2015 | Soon-Shiong | G06F 21/35 |
| | | | 726/7 |
| 2016/0203360 A1* | 7/2016 | Alvarez | G06F 3/017 |
| | | | 345/156 |
| 2016/0371854 A1* | 12/2016 | Gershon | G06T 7/90 |
| 2017/0083792 A1* | 3/2017 | Rodriguez-Serrano | |
| | | | G06T 7/74 |
| 2017/0109615 A1* | 4/2017 | Yatziv | G06K 9/6282 |
| 2018/0089540 A1* | 3/2018 | Merler | G06K 9/6268 |
| 2018/0101742 A1* | 4/2018 | Burge | G06V 40/161 |
| 2019/0121821 A1* | 4/2019 | Hsiao | G06F 16/532 |
| 2019/0163975 A1* | 5/2019 | Desai | G06V 20/20 |
| 2019/0325259 A1* | 10/2019 | Murphy | G06V 20/41 |
| 2020/0314122 A1* | 10/2020 | Jones | G06F 16/9566 |
| 2020/0401851 A1* | 12/2020 | Mau | G06N 3/08 |
| 2021/0149946 A1* | 5/2021 | VanBlon | G06V 10/235 |
| 2021/0174135 A1* | 6/2021 | Liu | G06K 9/6218 |
| 2021/0224313 A1* | 7/2021 | Liu | G06F 16/532 |

FOREIGN PATENT DOCUMENTS

| | | |
|---|---|---|
| CN | 103793466 A | 5/2014 |
| CN | 104933154 A | 9/2015 |
| CN | 105843925 A | 8/2016 |
| CN | 106126572 A | 11/2016 |
| CN | 106156118 A | 11/2016 |
| CN | 106294577 A | 1/2017 |
| CN | 107766582 A | 3/2018 |
| CN | 109376256 A | 2/2019 |
| CN | 109902198 A | 6/2019 |

OTHER PUBLICATIONS

Office Action dated Jun. 1, 2020, issued in counterpart CN application No. 201910180747.2, with English translation. (16 pages).

* cited by examiner

REVERSE IMAGE SEARCH METHOD, APPARATUS AND APPLICATION SYSTEM

CROSS-REFERENCE TO RELATED APPLICATIONS

This application claims benefit of the filing date of Chinese Patent Application No. 201910180747.2 filed on Mar. 11, 2019, the disclosure of which is hereby incorporated in its entirety by reference.

TECHNICAL FIELD

The present disclosure relates to display technologies, and in particular, to a reverse image search method, a reverse image search apparatus, and an application system of reverse image search.

BACKGROUND

With increasing data information of images on the Internet, user requirements for image searches are also continually increasing. A reverse image search method has emerged. The reverse image search method is a search technique which inputs an image to retrieve a same or similar image. At present, this method has problems such as slow search speed and high error rate in search results.

BRIEF SUMMARY

One embodiment of the present disclosure is a reverse image search method. The method may include: receiving a search image; extracting feature points of the search image; finding classes corresponding to the feature points of the search image respectively in an image classification index table, the classes comprising images in an image library; and searching the classes corresponding to the feature points of the search image in the image classification index table to obtain a target image having the largest number of identical feature points of the search image.

Optionally, searching the classes corresponding to the feature points of the search image in the image classification index table to obtain the target image having the largest number of identical feature points of the search image may include obtaining matching images having the identical feature points in the classes corresponding to the feature points of the search image in the image classification index table; sorting the matching images based on an order of the number of the identical feature points from largest to smallest or from smallest to largest; and obtaining the target image with the largest number of the identical feature points of the search image.

Optionally, after obtaining the matching images having the identical feature points in the classes corresponding to the feature points and before sorting the matching images based on the order of the number of the identical feature points from largest to smallest or from smallest to largest, the reverse image search method may further include deleting the matching images whose number of the identical feature points is less than or equal to a threshold.

Optionally, the reverse image search method may further include creating the image classification index table.

Optionally, creating the image classification index table may include: extracting feature points of each of the images in the image library; classifying the feature points of each of the images in the image library into a plurality of classes respectively; creating an index table between the plurality of classes and the images in the image library based on the feature points in the plurality of classes, thereby obtaining the image classification index table.

Optionally, the feature points of each of the images in the image library may be classified based on an established hierarchical version of integer K-means model.

Optionally, establishing the hierarchical version of integer K-means model may include: extracting feature points from images used for creating the model using a SIFT algorithm; randomly selecting K feature points as initial cluster centers and assigning the remaining feature points to the nearest cluster based on nearest neighbor principle; and recalculating a cluster center of each of new clusters iteratively until a change of the cluster center is very small.

Optionally, finding the classes corresponding to the feature points of the search image respectively in an image classification index table may include: classifying each of the feature points of the search image to obtain a class corresponding to each of the feature points of the search image; and finding the classes corresponding to the feature points of the search image in the image classification index table based on the class corresponding to each of the feature points of the search image.

Optionally, extracting the feature points of the search image may include: extracting the feature points of the search image using a SIFT algorithm.

Optionally, the feature points of the search image may be local features extracted from the search image based on a fixed grayscale deviation threshold.

Another embodiment of the present disclosure is a reverse image search apparatus. The reverse image search apparatus may include: a receiving module, configured to receive a search image; an extraction module, configured to extract feature points of the search image; and an acquisition module, configured to find classes corresponding to the feature points of the search image respectively in an image classification index table and search in the classes to obtain a target image having the largest number of identical feature points of the search image, wherein the classes in the image classification index table comprise images in an image library.

Optionally, the acquiring module may be further configured to obtain matching images having the identical feature points of the search image in the classes, sort the matching images based on an order of the number of the identical feature points from largest to smallest or from smallest to largest, and obtain the target image having the largest number of the identical feature points of the search image.

Optionally, the reverse image search apparatus may further include an index table creating module, configured to extract the feature points of each of the images in the image library and classifying the feature points of each of the images in the image library into a plurality of classes respectively, create an index table between the plurality of classes and the images in the images library based on the feature points in the plurality of classes, thereby obtaining an image classification index table.

Optionally, the acquisition module may be further configured to classify each of the feature points of the search image to obtain a class corresponding to each of the feature points of the search image, and find the classes corresponding to the feature points of the search image in the image classification index table based on the class corresponding to each of the feature points of the search image.

Another embodiment of the present disclosure is a reverse image recommendation method. The reverse image recommendation method may include: receiving search images;

obtaining tags of the search images; recording the number of occurrences of each of the tags based on the search images; and obtaining a target image having a tag that has the most cumulative number of occurrences.

Optionally, obtaining tags of the search image may include obtaining the tags of the search image using a hash model.

Another embodiment of the present disclosure is a reverse image recommendation apparatus. The apparatus may implement the reverse image recommendation method.

Another embodiment of the present disclosure is a reverse image search or recommendation application system. The reverse image search or recommendation application system may include a terminal, a server, and a screen. The server may include the reverse image search apparatus or the reverse image recommendation apparatus.

Optionally, the terminal may be configured to send the search image to the server, and receive the target image sent by the server, and the screen may be configured to receive and display the target image sent by the terminal.

One embodiment of the present disclosure is a reverse image search apparatus. The reverse image search apparatus may include a display screen; a processor; and a storage medium coupled to the processor and storing a computer program that, when executed by the processor, causes the processor to: receive a search image; extract feature points of the search image; and find classes corresponding to the feature points of the search image respectively in an image classification index table and search in the classes to obtain a target image having the largest number of identical feature points of the search image, wherein the classes in the image classification index table comprise images in an image library.

Optionally, the processor is further configured to obtain matching images having the identical feature points of the search image in the classes, sort the matching images based on an order of the number of the identical feature points from largest to smallest or from smallest to largest, and obtain the target image having the largest number of the identical feature points of the search image.

Optionally, the processor is further configured to extract the feature points of each of the images in the image library and classifying the feature points of each of the images in the image library into a plurality of classes respectively, create an index table between the plurality of classes and the images in the images library based on the feature points in the plurality of classes, thereby obtaining an image classification index table.

Optionally, the processor is further configured to classify each of the feature points of the search image to obtain a class corresponding to each of the feature points of the search image, and find the classes corresponding to the feature points of the search image in the image classification index table based on the class corresponding to each of the feature points of the search image.

BRIEF DESCRIPTION OF THE DRAWINGS

The drawings are intended to provide a further understanding of the technical solutions of the present disclosure, and are intended to be a part of the specification, and are used to explain the technical solutions of the present disclosure, and do not constitute a limitation of the technical solutions of the present disclosure.

DETAILED DESCRIPTION

Figure 1:
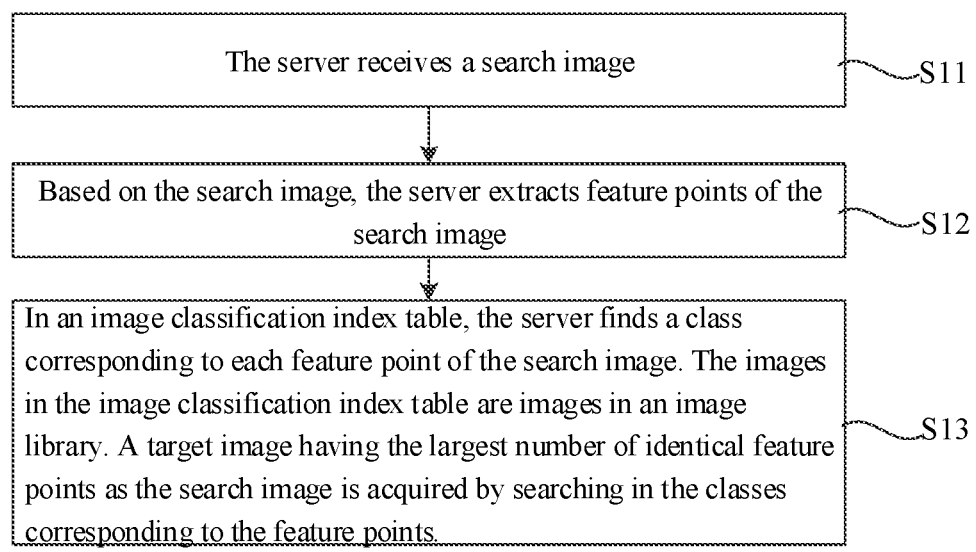
FIG. 1 is a flowchart of a reverse image search method according to one embodiment of the present disclosure.

When referring to the figures, like structures and elements shown throughout are indicated with like reference numerals. The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without creative efforts are within the scope of the present disclosure.

One embodiment of the present disclosure provides a reverse image search method, as shown in FIG. 1, including the following:

In step S11, the server receives a search image.

The entire reverse image search system may include a terminal, a server, and the like. Users utilize the terminal to take a photo and upload to the server or upload a photo in an album of the terminal to the server.

The terminal may be a mobile phone, a tablet computer, a personal computer (PC), a notebook computer, etc., but not limited hereto.

In step S12, based on the search image, the server extracts feature points of the search image.

The feature points are local features extracted from the search image based on a fixed grayscale deviation threshold. The server extracts the feature points of the search image and uses the feature points to facilitate the subsequent search method.

In step S13, in an image classification index table, the server finds a class corresponding to each feature point of the search image. The images in the image classification index table are images in an image library. A target image having the largest number of identical feature points of the search image is acquired by searching in the classes corresponding to the feature points of the search image in the image classification index table. The identical feature points refer to the feature points which are the same as some of the feature points of the search image.

The image classification index table is stored in a database of the server. The images in the image library are classified based on feature points, that is, the relationship between the feature points and the classes is obtained based on the feature points extracted from each image in the image library. The relationship between the classes and the images in the image library having the corresponding feature points is further obtained.

The server may locate classes in the image classification index table based on the classes to which the feature points of the search image belong, so as to obtain the target image having the largest number of identical feature points in the classes.

The target image is the one that is most similar or identical to the search image searched from the image library.

One embodiment of the present disclosure provides a reverse image search method. The method includes receiving a search image through a server, extracting feature points of the search image, and performing a search in classes corresponding to all feature points of the search image in the image classification index table to obtain a target image having the largest number of identical feature points as the search image. It can be seen that some embodiments of the present disclosure can quickly locate the classes corresponding to the feature points of the search image and quickly search in the classes based on the relationship between the classes in the image classification index table and the images in the image library with the corresponding feature points. Compared with the existing technology that each retrieval may need an iterative search, the search efficiency of the present disclosure is improved on the premise of ensuring the matching accuracy.

Optionally, the server extracts feature points of the search images in S12 includes extracting feature points of the search image using a scale-invariant feature transform (SIFT) algorithm by the server.

The SIFT algorithm is a local feature algorithm with relatively good performance. It has good invariant characteristics such as scale, rotation, illumination, and even has a higher tolerance to viewing angle changes, geometric distortion and imaging noise.

The SIFT algorithm uses a fixed grayscale deviation threshold to extract feature points, and the grayscale deviation threshold determines the number of feature points that can be obtained. The larger the grayscale deviation threshold is, the more extremum points are detected and the more the number of feature points is. The smaller the grayscale deviation threshold is, the fewer the detected extremum points are and the less the number of feature points is. Based on that, an appropriate grayscale deviation threshold can be selected based on requirements, which are not limited herein.

Figure 2:
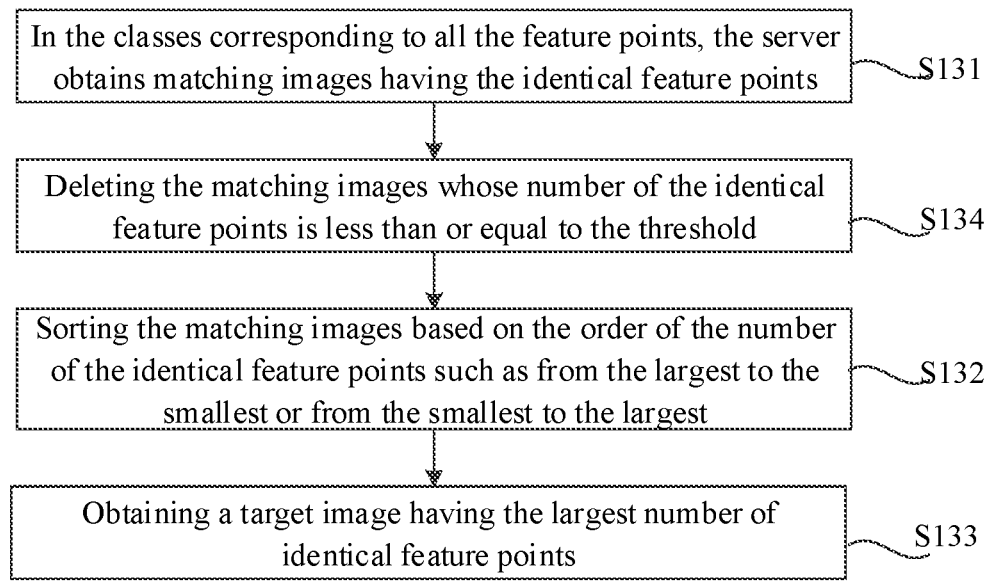
FIG. 2 is a flowchart of a reverse image search method according to one embodiment of the present disclosure.

In one embodiment, in the classes corresponding to all the feature points, that the target image having the largest number of identical feature points as the search image is obtained in S13, as shown in FIG. 2, includes the following:

In step S131, in the classes corresponding to all the feature points of the search image, the server obtains matching images having the identical feature points.

After the server locates the classes corresponding to the feature points of the search image in the image classification index table, it searches in the classes to obtain the matching images with the identical feature points. No images may be obtained (that is, no image has the identical feature points), or one or more matching images may be obtained.

The server searches in the classes corresponding to all the feature points of the search image one by one and obtains all matching images with the identical feature points.

It can be understood that there may be duplicate images in the matching images obtained by the server. The duplicate matching images means that the matching image has a plurality of identical feature points, and the image is retrieved each time a feature point is searched, the number of retrievals equals the number of the identical feather points.

Step S132 includes sorting the matching images based on the order of the number of the identical feature points such as from the largest to the smallest or from the smallest to the largest.

The server knows the number of identical feature points in each matching image by calculating the number of times the matching image is retrieved or appears. The more the number of identical feature points that the matching image has, the more similar the matching image is to the search image. The smaller the number, the more the difference of the matching image to the search image.

Step S133 includes obtaining a target image having the largest number of identical feature points.

The matching image with the largest number of identical feature points is most similar or identical to the search image.

Optionally, as shown in FIG. 2, after acquiring matching images having the identical feature points in S131, and before sorting the matching images based on the number of identical feature points from largest to smallest or from smallest to largest in S132, the method further includes:

Step S134 includes deleting the matching images whose number of the identical feature points is less than or equal to the threshold.

The size of the threshold may be set as needed, but not limited herein.

First, the matching images with the number of the identical feature points less than or equal to the threshold are deleted. That is, a majority of the matching images with lower similarity are deleted first, which reduces the workload of subsequent sorting and improves the search efficiency.

Optionally, the reverse image search method further includes: creating an image classification index table.

Figure 3:
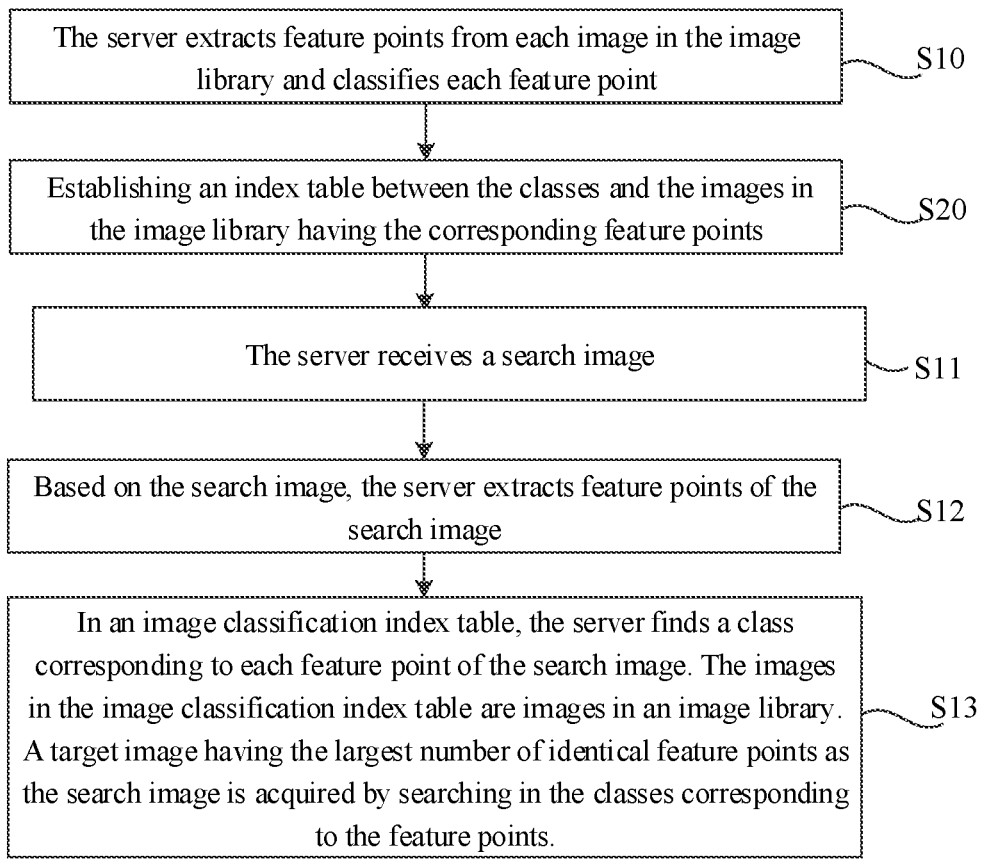
FIG. 3 is a flowchart of a reverse image search method according to one embodiment of the present disclosure.

As shown in FIG. 3, creating the image classification index table includes:

In step S10, the server extracts feature points from each image in the image library and classifies each feature point.

The image library is stored in a database on the server. Before the server classifies the images in the image library and creates the image classification index table, a hierarchical version of integer K-means (HIKM) model needs to be created.

The number of clusters in the HIKM model can be specified as needed, but not limited herein. For example, it can be specified as 125000 clusters.

In one embodiment, the process of creating a HIKM model includes:

First, the server uses the SIFT algorithm to extract feature points from the images used for creating the model.

It should be noted here that the images used for creating the model refer to the images used in the process of creating the HIKM model, and the images used for creating the model can be images obtained by any means such as artistic creation and design software.

Second, K (a positive integer) feature points are randomly selected as initial cluster centers, and the remaining feature points, based on the distances between the remaining feature points and the above-mentioned cluster centers, are respectively assigned to the nearest cluster based on the nearest neighbor principle.

Finally, the cluster center of each new cluster obtained (the mean of all the feature points in the cluster) is recalculated, and the process is iterated until the change of the cluster center is very small. Then, the HIKM model is established.

The method for calculating the distance between the feature point and the cluster center may use a Euclidean distance algorithm, or a Manhattan algorithm, etc., but not limited hereto.

The feature points of each image are classified based on the established HIKM model, and the class corresponding to each feature point is thus obtained.

Step S20 includes, based on the feature point in each class, establishing an index table between the classes and the images in the image library having the corresponding feature points based on the feature point in each class, thereby obtaining the image classification index table.

The image classification index table has a plurality of classes, the number of classes in the image classification index table is the same as the number of clusters in the HIKM model, and each class corresponds to each cluster in the HIKM model. For example, the HIKM model includes 125000 clusters, and the image classification index table includes 125000 classes, and one cluster of the HIKM model corresponds to one class of the image classification index tables.

Figure 4:
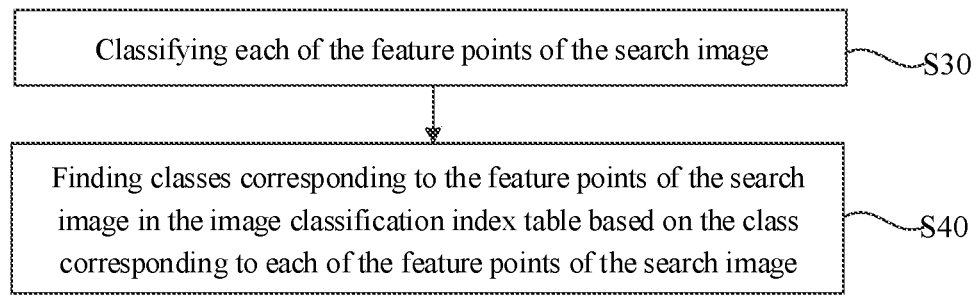
FIG. 4 is a flowchart of a reverse image search method according to one embodiment of the present disclosure.

Optionally, as shown in FIG. 4, that the server finds the class corresponding to each feature point of the search image in the image classification index table in S13 includes:

Step S30 includes classifying each of the feature points of the search image.

Among them, the feature points of the search image can be extracted based on the SIFT algorithm. The extracted feature points of the search images are classified based on the established HIKM model, and the class to which each feature point in the search image belongs is obtained.

Step S40 includes finding classes corresponding to the feature points of the search image in the image classification index table based on the class corresponding to each of the feature points of the search image.

Since the HIKM model has the same number of clusters as the number of corresponding classes in the image classification index table, the corresponding classes in the image classification index table can be known based on the class to which each feature point in the search image belongs.

Based on the above description, a reverse image search method is provided below to illustrate its implementation process.

Figure 5:
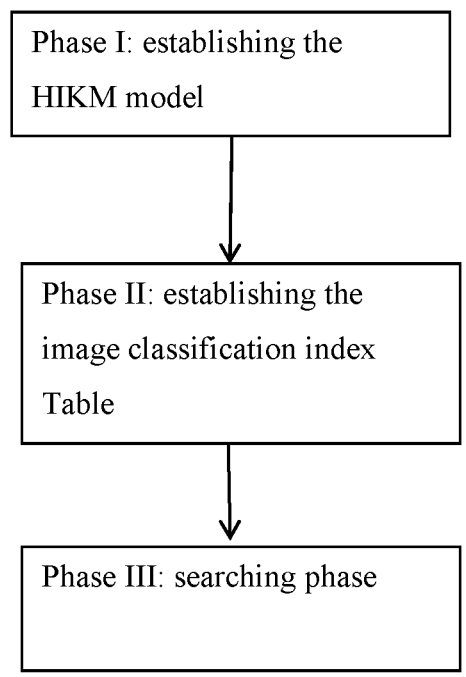
FIG. 5 is a flowchart of a reverse image search method according to one embodiment of the present disclosure.

In one embodiment, as shown in FIG. 5, there are three phases:

The first phase is the phase of establishing the HIKM model. First, the server extracts feature points from, for example, 70,000 images, which are selected for establishing the model using the SIFT algorithm, and extracts, for example, 60,000,000 feature points from those images. Second, for example, 125,000 feature points are randomly selected as the initial cluster centers, and the remaining feature points, based on the distance between the feature points and the 125,000 initial cluster centers, are respectively assigned to the nearest cluster based on the nearest neighbor principle. Then, using the Euclidean distance algorithm, the cluster center of each new cluster is recalculated, and the process is iterated until the change of the cluster center is very small. Then, the HIKM model is established, and the HIKM model has a total of 125,000 clusters.

The second phase is the phase of establishing the image classification index table. First, the server extracts feature points from, for example, 10,000 images in the image library, using the SIFT algorithm, and extracts, for example, 10,000,000 feature points. Second, using the established HIKM model for classification, the 10,000,000 feature points are divided into 125,000 clusters of the HIKM model. For example, 100 feature points are assigned to the first cluster of the HIKM model. Based on the 100 feature points in the first cluster (for example, there are 90 images in the image library, each image has at least one of these 100 feature points), an index table between the first class and the images (the 90 images) in the image library having the feature points are created, and so on, thereby obtaining an image classification index table.

The third phase is the searching phase. First, the server extracts the feature points of the search image based on the SIFT algorithm, for example, extracts 50 feature points, and performs classification based on the established HIKM model to obtains the classes to which the above 50 feature points belong. Next, based on the 50 feature points, corresponding to, for example, 8 classes of the HIKM model, the above 8 classes are found in the image classification index table. Then, a search is performed in the 8 classes in the image classification index table to obtain, for example, five matching images having the identical feature points. When searching in the 8 classes corresponding to 50 feature points, for example, at most 10 feature points are searched to be in a same image. This indicates that the matching image has 10 identical feature points.

Based on the above, the matching image with 10 identical feature points is the target image, which is most similar to the search image.

Figure 6:
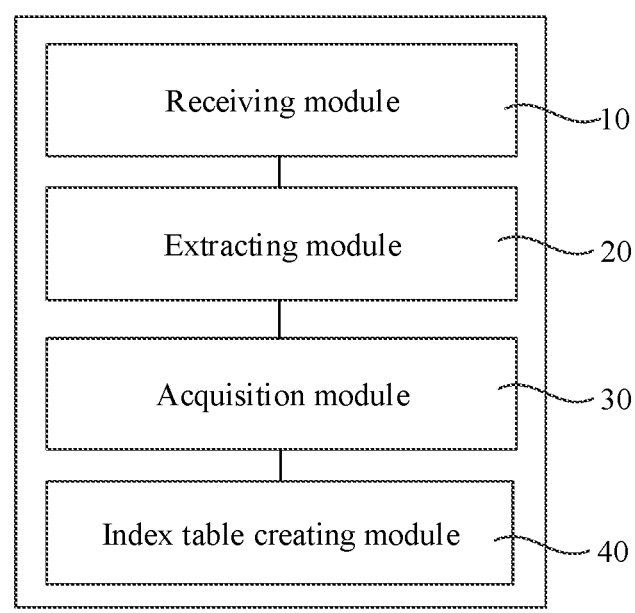
FIG. 6 is a schematic diagram of a reverse image search apparatus module according to one embodiment of the present disclosure.

One embodiment of the present disclosure further provides a reverse image search apparatus. As shown in FIG. 6, the apparatus includes: a receiving module 10 configured to receive a search image; an extracting module 20 configured to extract feature points of the search image; and an acquisition module 30 configured to: find classes corresponding to the feature points of the search image in the image classification index table, where the images in the image classification index table are images in the image library, and obtain a target image having the largest number of identical feature points by searching in the classes corresponding to all the feature points of the search image in the image classification index table. The identical feature point is a feature point that is the same as a feature point of the search image.

For example, a reverse image search apparatus is integrated into a server. In one embodiment, the reverse image search apparatus receives the search image from the receiving module 10, extracts the feature points of the search image using the extracting module 20, performs a search in the classes corresponding to all feature points of the search image in the image classification index table and obtains a target image having the largest number of identical feature points using the acquisition module 30. It can be seen that some embodiments of the present disclosure can quickly locate the classes corresponding to the feature points of the search image and quickly search in the classes based on the relationship between the classes in the image classification index table and the images in the image library having the corresponding feature points. Compared with the existing technology that each query may need an iterative searching, the search efficiency according to some embodiments of the present disclosure is improved on the premise of ensuring the matching accuracy.

The receiving module 10 may include a wireless or wired transceiver circuit, a field-programmable gate array (FPGA), a central processing unit (CPU), a processing chip or a microcontroller unit (MCU), or any other components capable of performing a data transceiving function. The extracting module 20 may include a field-programmable gate array (FPGA), a central processing unit (CPU), a processing chip or a microcontroller unit (MCU), or any other components capable of performing a data processing function, but not limited hereto.

Optionally, the acquisition module 30 obtains the target image with the largest number of identical feature points in the classes corresponding to all the feature points of the search image includes the following:

The acquisition module 30 obtains matching images having the identical feature points in the classes corresponding to all feature points in the image classification index table, sorts the matching images based on the order of the number of the identical feature points from largest to smallest or from smallest to largest, and obtains the target image having the largest number of identical feature points.

The acquisition module 30 obtains all the matching images with the identical feature points in the classes corresponding to all the feature points of the search image and calculates the number of identical feature points of each matching image by calculating the number of appearance of the matching images. By sorting in order, the acquisition module obtains the matching image with the largest number of identical feature points, which is most similar or identical to the search image.

In one embodiment, on the basis of that, after acquiring the matching images having the identical feature points and before sorting the matching images based on the order of the identical feature points from largest to smallest or from smallest to largest, the acquisition module 30 may further be configured to delete matching images having the number of the identical feature points less than or equal to a threshold.

The acquisition module 30 first deletes the matching images whose number of identical feature points is less than or equal to the threshold, that is, first deletes most of the matching images with low similarity, which reduces the workload of subsequent sorting and improves the search efficiency.

The acquisition module 30 may include a field-programmable gate array (FPGA), a central processing unit (CPU), a processing chip or a microcontroller unit (MCU), or any other components capable of performing a data processing function, but not limited hereto.

Optionally, as shown in FIG. 6, the reverse image search apparatus further includes an index table creating module 40. The index table creating module 40 is configured to extract feature points for each image in the image library, and classify each feature point; based on the feature point in each class, establish an index table between the classes and the images in the image library having the corresponding feature points, thereby obtaining the image classification index table.

The index table creating module 40 may include a field-programmable gate array (FPGA), a central processing unit (CPU), a processing chip or a microcontroller unit (MCU), or any other components capable of performing a data processing function, but not limited hereto.

On the basis of that, optionally, that the acquisition module 30 finds classes corresponding to feature points of the search image in the image classification index table includes the following:

The acquisition module 30 classifies each feature point of the search image and finds the class corresponding to each of the feature points of the search image in the image classification index table based on the class corresponding to each feature point of the search image.

The acquisition module 30 classifies each of the feature points of the search image based on the established HIKM model, obtains a relationship between the feature points and the classes, and further obtains a relationship between the classes and the images having the corresponding feature points, thereby locating the classes in the image classification index table.

Figure 7:
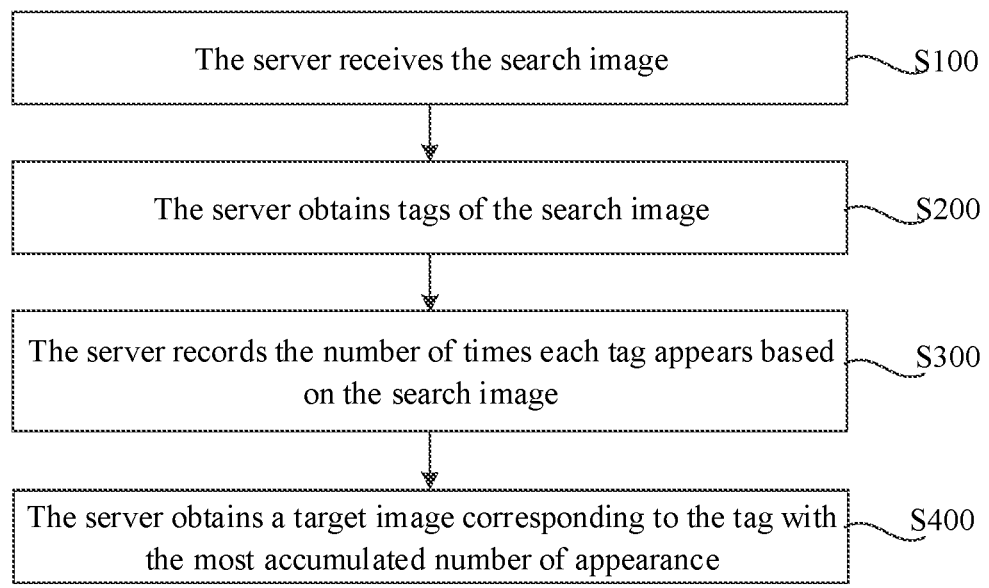
FIG. 7 is a flowchart of a reverse image search method according to one embodiment of the present disclosure.

One embodiment of the present disclosure further provides a reverse image recommendation method, as shown in FIG. 7, including the following:

In step S100, the server receives the search images.

The entire reverse image search system may include a terminal, a server, and the like. Users use the terminal to take a photo and upload to the server or upload a photo in an album of the terminal to the server.

The terminal may be a mobile phone, a tablet computer, a PC, a notebook, a screen, and the like, but not limited hereto.

In step S200, the server obtains tags of the search images.

Optionally, the server obtains tags of the search images in S200 includes acquiring the tags of the search images using a hash model.

The search images may be input into the deep convolutional neural network (CNN) of a trained hash model, and the server obtains the tags of the search images based on the convolutional neural network.

The training process of the hash model includes: inputting two images having known tags into the deep convolutional neural network each time, and determining whether the two images have the same tags based on the deep convolutional neural network. If there is one same tag, the deep convolutional neural network outputs a result that is 0. If there is no same tag, the output result is 1.

If the hash model is in the training process and the output result from the deep convolutional neural network is between 0 and 1, an error between the actual result and the expected result needs to be calculated, and a reverse adjustment is performed on the parameters of the deep convolutional neural network to correct the error and output an accurate result. Furthermore, the accuracy of extracting tags in the hash model can also be improved.

In step S300, the server records the number of times each tag appears based on the search images.

Optionally, the user performs a search. The uploaded search image is labeled as "sketch" and the number of "sketch" tag is increased by one.

S400: The server obtains a target image corresponding to the tag with the most accumulated number of appearance to be recommended.

The user's search habits and preferences can be determined by recording and analyzing the tags of the user's searches for images.

For example, after the user has used the reverse image search function multiple times, the "sketch" is the tag that appears most in the user's searches, and then the user is considered to prefer the "sketch" style image. Therefore, the user is recommended to the "sketch" style related images first. Alternatively, for example, after the user uses the reverse image search function multiple times, the "sketch" and "dog" tags appear the most times while retrieving user's searches, and the user is considered to prefer the images of dog sketches. Therefore, the user is recommended to the images with the "sketch" and "dog" tags first. One embodiment of the present disclosure provides a reverse image recommendation method by using a hash model. The method records the number of appearance of the tags and s the tag with the most accumulated number of appearance, and recommends the target image with the tag having the most number of appearances to the user. Therefore, the recommendation can be made based on the user's interest and the accuracy of the recommendation can be improved.

Optionally, the reverse image recommendation method further includes acquiring a target image based on the favorite tag set by the user.

For example, the user can preset the favorite tag as "oil painting." During use, the "oil painting" related image can be preferentially recommended to improve the accuracy of the recommendation.

Figure 8:
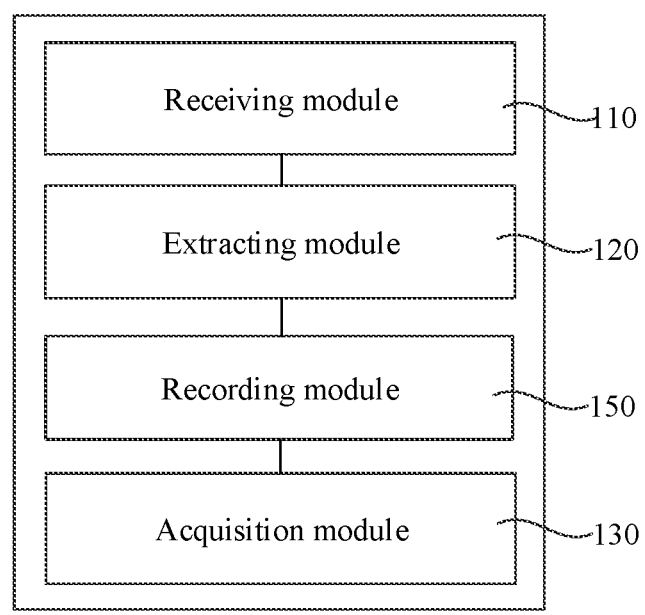
FIG. 8 is a schematic diagram of a reverse image search apparatus module according to one embodiment of the present disclosure.

Another embodiment of the present disclosure further provides a reverse image recommendation apparatus. As shown in FIG. 8, the apparatus includes: a receiving module 110 configured to receive search images; an extracting module 120 configured to acquire tags of the search images; and a recording module 150 configured to record the number of appearance of each of the tags based on the search images; an acquisition module 130 configured to obtain a target image corresponding to the tag with the most accumulated number of appearance.

The receiving module 110 may include a wireless or wired transceiver circuit, a field-programmable gate array (FPGA), a central processing unit (CPU), a processing chip or a microcontroller unit (MCU), or any other components capable of performing a data transceiving function. The extracting module 120 may include a field-programmable gate array (FPGA), a central processing unit (CPU), a processing chip or a microcontroller unit (MCU), or any other components capable of performing a data processing function, but not limited hereto. The acquisition module 130 may include a field-programmable gate array (FPGA), a central processing unit (CPU), a processing chip or a microcontroller unit (MCU), or any other components capable of performing a data processing function, but not limited hereto.

In one embodiment, the extracting module 120 of the reverse image recommendation apparatus acquires the tags of the search images. The recording module 150 records the number of appearance of the tags. The acquisition module 130 obtains the target image with the tag having the largest number of accumulated appearance and recommends the target image to the user. Therefore, the recommendation can be made based on the user's interest, and the accuracy of the recommendation is improved.

The recording module 150 may include a field-programmable gate array (FPGA), a central processing unit (CPU), a processing chip or a microcontroller unit (MCU), or any other components capable of performing a data processing function, but not limited hereto. The recording module 150 may also include a memory, a hard disk, a floppy disk, a memory chip, and the like. The recording module may be any other components that have a storage function, but not limited hereto.

Optionally, that the extracting module 120 acquires the tags of the search images includes that the extracting module 120 obtains the tags of the search images by using the hash model.

Optionally, the acquisition module 130 is further configured to acquire a target image based on the favorite tag set by the user.

Figure 9:
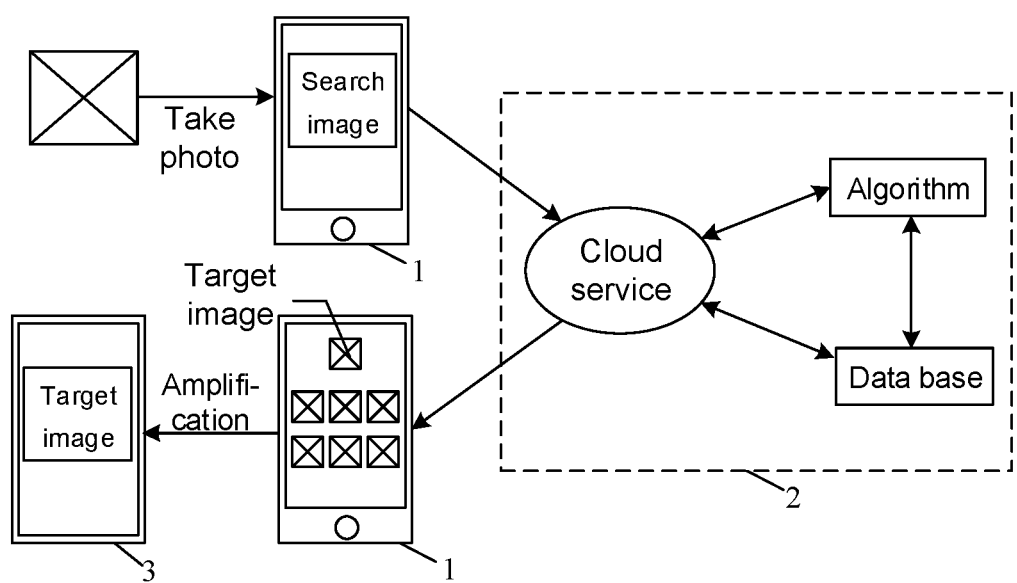
FIG. 9 is a schematic diagram of a reverse image search application system according to one embodiment of the present disclosure.

Another embodiment of the present disclosure further provides an application system of reverse image search. As shown in FIG. 9, the system includes a terminal 1, a server 2, and a screen 3. The above-mentioned reverse image search apparatus is integrated in the server 2.

The terminal 1 is configured to send a search image to the server 2 and receive a target image sent by the server 2.

The screen 3 is configured to receive and display the target image transmitted by the terminal 1.

The user takes photos using an app in the terminal 1 and uploads to the server 2 or uploads photos in the album of the terminal 1 as the search image to the server 2. The terminal 1 may be a device such as a mobile phone, a tablet computer, a PC, a notebook computer, etc., but not limited hereto The server 2 obtains the target image and sends it to the terminal 1 from a reverse image search apparatus to achieve the reverse image search. In addition, when the user opens the application having the reverse image search function in the terminal 1, the target image can be directly displayed on the interface of the terminal 1 as recommendation for the user.

For example, as shown in FIG. 9, when using the application system of reverse image search, the user can use the mobile app to take a photo of the painting of interest, and upload the photo to search for the original or similar images of the painting of interest (the uploaded photo is a search image). The server 2 receives the search image sent by the terminal, retrieves the target image (i.e., the original image or the similar image of the painting), and sends it to the app in the mobile phone. After receiving the target image, the mobile app sends to the screen 3, and the screen 3 receives and enlarges the displayed target image.

The above is only a specific embodiment of the present disclosure, but the scope of the present disclosure is not limited thereto, and any person skilled in the art can change or substitutions within the technical scope of the present disclosure. It should be covered by the scope of the present disclosure. Therefore, the scope of the disclosure should be determined by the scope of the appended claims.

In the description of the following embodiments, specific features, structures, materials or characteristics may be combined in any suitable manner in any one or more embodiments or examples.

What is claimed is:

1. A reverse image search method, comprising:
   receiving a search image;
   extracting feature points of the search image;
   finding classes corresponding to the feature points of the search image respectively in an image classification index table, the classes comprising images in an image library; and
   searching the classes corresponding to the feature points of the search image in the image classification index table to obtain a target image having the largest number of identical feature points of the search image;
   wherein searching the classes corresponding to the feature points of the search image in the image classification index table to obtain the target image having the largest number of identical feature points of the search image comprises:
   obtaining matching images having the identical feature points in the classes corresponding to the feature points of the search image in the image classification index table;
   sorting the matching images based on an order of the number of the identical feature points from largest to smallest or from smallest to largest; and
   obtaining the target image with the largest number of the identical feature points of the search image.

2. The reverse image search method according to claim 1, after obtaining the matching images having the identical feature points in the classes corresponding to the feature points and before sorting the matching images based on the order of the number of the identical feature points from largest to smallest or from smallest to largest, further comprising:
  deleting the matching images whose number of the identical feature points is less than or equal to a threshold.

3. The reverse image search method according claim 1, further comprising creating the image classification index table.

4. The reverse image search method according to claim 3, wherein creating the image classification index table comprises:
  extracting feature points of each of the images in the image library;
  classifying the feature points of each of the images in the image library into a plurality of classes respectively;
  creating an index table between the plurality of classes and the images in the image library based on the feature points in the plurality of classes, thereby obtaining the image classification index table.

5. The reverse image search method according to claim 4, wherein the feature points of each of the images in the image library are classified based on an established hierarchical version of integer K-means model.

6. The reverse image search method according to claim 5, wherein establishing the hierarchical version of integer K-means model comprises:
  extracting feature points from images used for creating the model using a SIFT algorithm;
  randomly selecting K feature points as initial cluster centers and assigning the remaining feature points to the nearest cluster based on nearest neighbor principle; and
  recalculating a cluster center of each of new clusters iteratively until change of the cluster center is very small.

7. The reverse image search method according to claim 4, wherein finding the classes corresponding to the feature points of the search image respectively in an image classification index table comprises:
  classifying each of the feature points of the search image to obtain a class corresponding to each of the feature points of the search image; and
  finding the classes corresponding to the feature points of the search image in the image classification index table based on the class corresponding to each of the feature points of the search image.

8. The reverse image search method according to claim 1, wherein extracting the feature points of the search image comprises:
  extracting the feature points of the search image using a SIFT algorithm.

9. The reverse image search method according to claim 8, wherein the feature points of the search image are local features extracted from the search image based on a fixed grayscale deviation threshold.

10. A reverse image search apparatus, comprising:
  a receiving module, configured to receive a search image;
  an extraction module, configured to extract feature points of the search image; and
  an acquisition module, configured to find classes corresponding to the feature points of the search image respectively in an image classification index table and search in the classes to obtain a target image having the largest number of identical feature points of the search image,
  wherein the classes in the image classification index table comprise images in an image library; and
  the acquisition module is further configured to obtain matching images having the identical feature points of the search image in the classes, sort the matching images based on an order of the number of the identical feature points from largest to smallest or from smallest to largest, and obtain the target image having the largest number of the identical feature points of the search image.

11. The reverse image search apparatus according to claim 10, further comprising an index table creating module, configured to extract the feature points of each of the images in the image library and classifying the feature points of each of the images in the image library into a plurality of classes respectively, create an index table between the plurality of classes and the images in the images library based on the feature points in the plurality of classes, thereby obtaining an image classification index table.

12. The reverse image search apparatus according to claim 11, wherein the acquisition module is further configured to classify each of the feature points of the search image to obtain a class corresponding to each of the feature points of the search image, and find the classes corresponding to the feature points of the search image in the image classification index table based on the class corresponding to each of the feature points of the search image.

13. A reverse image search or recommendation application system, comprising: a terminal, a server, and a screen;
  the server comprising the reverse image search apparatus according to claim 10.

14. The reverse image search or recommendation application system of claim 13, wherein the terminal is configured to send the search image to the server, and receive the target image sent by the server, and the screen is configured to receive and display the target image sent by the terminal.

15. A reverse image search apparatus, comprising:
  a display screen;
  a processor;
  and a storage medium coupled to the processor and storing a computer program that, when executed by the processor, causes the processor to:
  receive a search image;
  extract feature points of the search image; and
  find classes corresponding to the feature points of the search image respectively in an image classification index table and search in the classes to obtain a target image having the largest number of identical feature points of the search image,
  wherein the classes in the image classification index table comprise images in an image library; and
  the processor is further configured to obtain matching images having the identical feature points of the search image in the classes, sort the matching images based on an order of the number of the identical feature points from largest to smallest or from smallest to largest, and obtain the target image having the largest number of the identical feature points of the search image.

16. The reverse image search apparatus according to claim 15, wherein the processor is further configured to extract the feature points of each of the images in the image library and classifying the feature points of each of the images in the image library into a plurality of classes respectively, create an index table between the plurality of classes and the images in the images library based on the feature points in the plurality of classes, thereby obtaining an image classification index table.

17. The reverse image search apparatus according to claim 16, wherein the processor is further configured to classify each of the feature points of the search image to obtain a class corresponding to each of the feature points of the search image, and find the classes corresponding to the feature points of the search image in the image classification index table based on the class corresponding to each of the feature points of the search image.

* * * * *